United States Patent
Rosenkranz et al.

(10) Patent No.: US 12,431,590 B2
(45) Date of Patent: Sep. 30, 2025

(54) CELL COMPOSITE COMPRISING A PLURALITY OF ENERGY STORAGE CELLS AND METHOD FOR PRODUCTION THEREOF

(71) Applicant: Hella GmbH & Co KGaA, Lippstadt (DE)

(72) Inventors: Steffen Rosenkranz, Hameln (DE); Bastian Bloemeke, Diemelstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 644 days.

(21) Appl. No.: 17/735,183

(22) Filed: May 3, 2022

(65) Prior Publication Data
US 2022/0263200 A1 Aug. 18, 2022

Related U.S. Application Data

(63) Continuation of application No. PCT/EP2020/080369, filed on Oct. 29, 2020.

(30) Foreign Application Priority Data

Nov. 4, 2019 (DE) ...................... 10 2019 127 703.5

(51) Int. Cl.
*H01M 50/503* (2021.01)
*H01M 50/105* (2021.01)
(Continued)

(52) U.S. Cl.
CPC ....... *H01M 50/503* (2021.01); *H01M 50/204* (2021.01); *H01M 50/516* (2021.01); *H01M 50/105* (2021.01)

(58) Field of Classification Search
CPC ............. H01M 50/503; H01M 50/516; H01M 50/204; H01M 50/105
See application file for complete search history.

(56) References Cited

U.S. PATENT DOCUMENTS 10,276,851 B2   4/2019  Bachmann et al.
10,497,921 B2   12/2019 Kotter et al.
(Continued)

FOREIGN PATENT DOCUMENTS

DE   102011120470 A1   6/2013
DE   102013212348 A1   12/2014
(Continued)

OTHER PUBLICATIONS

DE102013213710A1 machine translation (Year: 2024).*
International Search Report dated Feb. 8, 2021 in corresponding application PCT/EP2020/080369.

*Primary Examiner* — Brian R Ohara
*Assistant Examiner* — M. T. Leonard
(74) *Attorney, Agent, or Firm* — Muncy, Geissler, Olds & Lowe, P.C.

(57) ABSTRACT

A cell composite having a plurality of energy storage cells, each having two, in particular planar, terminal connections, wherein a terminal connection of an energy storage cell in each case is conductively connected to a terminal connection of an adjacent energy storage cell. In order to improve the production of such a cell composite and the cell composite itself, the conductively connected terminal connections are connected to each other by welding by a separate cell connector in a mounting position of the cell connector. The cell connector has a corresponding tongue to the respective terminal connection in each case, and the terminal connections and the tongues each have a plurality of corresponding slots The slots of the terminal connections extend substantially perpendicular to a free end of the respective terminal connection in a direction of a connection region of the respective terminal connections.

16 Claims, 6 Drawing Sheets

(51) Int. Cl.
*H01M 50/204* (2021.01)
*H01M 50/516* (2021.01)

(56) References Cited

U.S. PATENT DOCUMENTS

| | | | | |
|---|---|---|---|---|
| 2010/0247998 | A1* | 9/2010 | Hostler | H01H 85/0241 |
| | | | | 429/120 |
| 2012/0288744 | A1* | 11/2012 | Guen | H01M 50/553 |
| | | | | 429/158 |
| 2014/0147729 | A1* | 5/2014 | Moon | H01M 50/516 |
| | | | | 429/158 |
| 2014/0363704 | A1* | 12/2014 | Bachmann | H01M 10/4257 |
| | | | | 429/7 |
| 2019/0198846 | A1* | 6/2019 | Kotter | H01R 13/112 |
| 2019/0296313 | A1 | 9/2019 | Kato | |

FOREIGN PATENT DOCUMENTS

| | | | | |
|---|---|---|---|---|
| DE | 102013213710 A1 * | 1/2015 | | H01M 2/206 |
| DE | 102014209273 A1 | 11/2015 | | |

\* cited by examiner

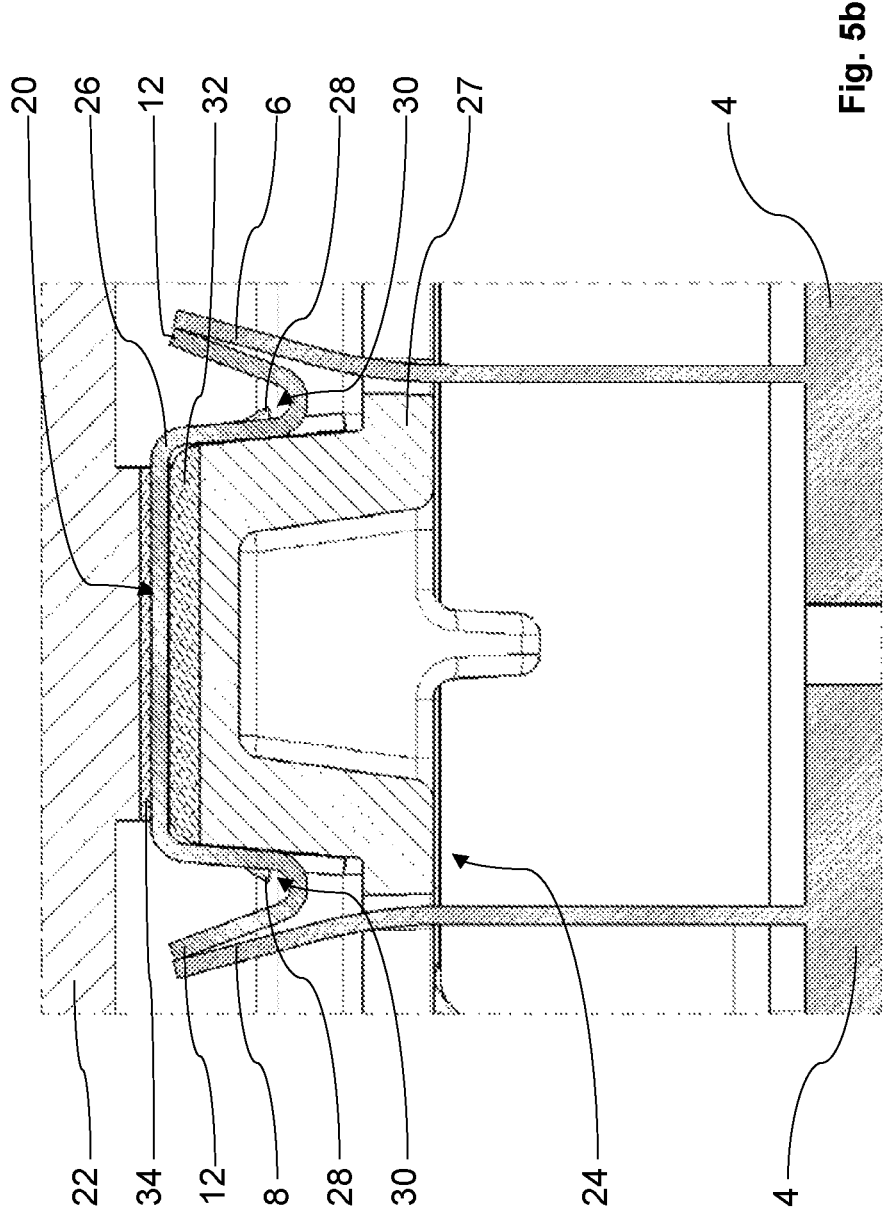

CELL COMPOSITE COMPRISING A PLURALITY OF ENERGY STORAGE CELLS AND METHOD FOR PRODUCTION THEREOF

This nonprovisional application is a continuation of International Application No. PCT/EP2020/080369, which was filed on Oct. 29, 2020, and which claims priority to German Patent Application No. 10 2019 127 703.5, which was filed in Germany on Nov. 4, 2019, and which are both herein incorporated by reference.

BACKGROUND OF THE INVENTION

Field of the Invention

The present invention relates to a cell composite comprising a plurality of energy storage cells and to a method for the production of a cell composite.

Description of the Background Art

Cell composites are already known from the prior art in numerous embodiment variants. For example, so-called pouch cells are known, which are also referred to as pouch bag cells or coffee bag cells. Pouch cells are bag-shaped or pocket-shaped and have only a small thickness and low weight compared to other designs.

SUMMARY OF THE INVENTION

It is therefore an object of the present invention to improve the production of a cell composite and the cell composite itself.

This object is achieved by a cell composite, which is characterized in that the conductively connected terminal connections are connected to each other by welding by means of a separate cell connector in a mounting position of the cell connector, wherein the cell connector has a tongue corresponding to the terminal connection in each case, and wherein the terminal connections and the tongues each have a plurality of corresponding slots, and wherein the slots of the terminal connections extend substantially perpendicular from a free end of the respective terminal connections in the direction of a connection region of the respective terminal connections with the rest of the energy storage cell, and wherein the slots of the tongues extend substantially perpendicular from a free end of the respective tongues in the direction of a connection region of the respective tongues with the rest of the cell connector. The conductive connections are materially bonded or diffuse by means of the weld joints. Further, this object is achieved by a method, which is characterized in that the terminal connections are connected to the corresponding tongues of the cell connector by welding, preferably laser welding.

An advantage of the invention is in particular that the production of such a cell composite and the cell composite itself is improved. Due to the connection of the terminal connections to be connected by means of a separate cell connector, it is possible, for example, to form the connections in such a way that the connections are can be non-destructively checked. On the one hand, it is ensured that the connections are properly executed and thus functionally reliable. On the other hand, unlike not using a non-destructive test, the connections can be checked 100%. The corresponding slots of the terminal connections of the energy storage cells and the tongues of the cell connector also enable a gentle production of the weld joints and a substantially free shrinkage of the melt, so that acute cracking or hard embrittlement during welding is effectively prevented.

Basically, the weld joints of the terminal connections of the energy storage cells with the corresponding tongues of the cell connector are freely selectable within wide suitable limits. A particularly advantageous further development of the cell composite according to the invention provides that the slots of the terminal connections and the tongues are dimensioned and positioned to each other in such a way that the corresponding terminal connections and tongues can each be spot-welded together between the slots. This makes it possible, for example, to produce the weld joints with only a low laser energy and thus a low heat input into the connection of the temperature-sensitive battery cells. Spot welding also has the advantage that the risk of cracking is significantly reduced.

The corresponding terminal connections and tongues can each be welded together by a plurality of spot welds.

The terminal connections and/or the tongues can be spring-loaded, wherein the terminal connections and the corresponding tongues are prestressed against each other in the mounting position of the cell connector. In this way, the arrangement of the two joining partners, namely the terminal connections on one side and the tongues on the other, is ensured, which is necessary for the production of a proper weld joint. A correspondingly complex fixation of the joining partners by means of a welding device or the like is not required. The spring-loaded terminal connections and/or tongues also serve as a tolerance compensation in order to be able to compensate for unavoidable component tolerances in a structurally simple manner.

The tongues of the cell connector can be formed in such a way that in the mounting position of the cell connector the tongues rest against the corresponding terminal connections in a wedge shape. As a result, proper positioning, and fixation of the two joining partners, namely the terminal connections and the corresponding tongues, relative to each other is further improved. Due to the wedge geometry, the tongues of the cell connector position themselves automatically to the corresponding terminal connections when the cell connector is transferred to its mounting position.

The terminal connections and/or the tongues, in addition to the respective slots, can have at least one notch, wherein the notch runs substantially parallel to the respective slots and is formed in such a way that the bending stiffness of the respective terminal connection and/or the respective tongue is reduced. In this way, the bending stiffness of the terminal connections and/or the tongues is reduced in the desired way, so that the transfer of the cell connector to its mounting position is possible, for example, with less effort. Preferably, the notches are each simultaneously formed as a slot of the terminal connections and/or the tongues. If notches are formed only on the side of the terminal connections or the side of the tongues, it is advantageous to form the slots of the corresponding tongues or terminal connections in such a way that the number of prongs formed by means of the slots and notches on one side corresponds to the number of prongs formed by means of the slots on the other side and corresponding prongs of the terminal connections and the tongues are substantially congruent to each other in the mounting position of the cell connector.

The cell connector on its side facing away from the energy storage cells can have a heat transfer section for heat transfer from the tongues of the cell connector to a separate heat sink. As a result, the functionality of the cell connector is increased, so that the number of components of the cell composite according to the invention is reduced in the desired manner. Due to the formation of the cell connector as a separate component, it is possible to adapt the cell connector in a structurally simple manner to its function as a heat transfer element for heat transfer from the corresponding energy storage cells to the heat sink.

The cell connector can have an at least partially elastic core, wherein the tongues are preferably detachably attached to the core. In this way, additional tolerance compensation between the individual components of the cell composite according to the invention is possible. For example, it is thus possible to improve the heat transfer connection between the aforementioned heat transfer section of the cell connector to the separate heat sink. Thus, it is possible that due to the at least partially elastic core of the cell connector, the thickness of a required electrical insulating layer between the cell connector on the one hand and the heat sink on the other side only needs to be minimally formed.

Basically, the cell connector can be freely selected according to type, function, material, dimensioning, arrangement, and number within wide suitable limits. This applies in particular to the tongues of the cell connector. An advantageous further development of the cell composite according to the invention provides that the tongues of the cell connector are formed of copper. Copper is an excellent electrical and thermal conductor.

The energy storage cells of the cell composite according to the invention can also be freely selectable according to type, function, material, dimensioning, arrangement, and number within wide suitable limits. This applies in particular to the two terminal connections of the individual energy storage cell. An advantageous further development of the cell composite according to the invention provides that the two terminal connections of the respective energy storage cell are produced from different materials, wherein the materials differ from each other at least with regard to their melting points. The difference in material of the two terminal connections offers advantages in regard to the function of the cell composite. Accordingly, it makes sense to design the two terminal connections of the respective energy storage cell of the cell composite differently. The corresponding slots of the terminal connections of the energy storage cells and the tongues of the cell connector allow for the gentle production of the weld joints and a substantially free shrinkage of the melt, in particular in the case of the abovementioned difference in material, so that acute cracking or hard embrittlement during welding is effectively prevented.

For example, an advantageous further development of the aforementioned embodiment of the cell composite according to the invention provides that each energy storage cell can have a copper terminal connection made of copper and an aluminum terminal connection of aluminum. Copper and aluminum are good electrical and thermal conductors. Especially in connection with the aforementioned tongues of the cell connector made of copper, the further advantage results in that the weld joints of the copper terminal connections with the tongues made of copper are completely unproblematic. Due to the formation of the terminal connections and the tongues according to the invention, namely the correspondingly formed slots of the terminal connections and tongues to be connected to each other, the weld joints between the aluminum terminal connections and the tongues of copper, as already generally stated in the preceding paragraph, are also significantly improved.

In the following, a copper terminal connection can refer to a terminal connection made of copper or largely of copper. In addition, an aluminum terminal connection refers to a terminal connection made of aluminum or largely aluminum.

To further improve the weld joint of material-different terminal connections and tongues, an advantageous further development of the method according to the invention provides that the terminal connections and the corresponding tongues are positioned, in the transfer of the cell connector to its mounting position, in such a way that by means of this positioning the proportion of the respective material in corresponding and material-different terminal connections and tongues can be adjusted when connected. This makes it possible to adjust the proportion of the respective material, for example the aluminum of an aluminum terminal connection on one side and the copper of a copper tongue assigned to this aluminum terminal connection on the other side, in order to produce a proper and thus functionally reliable weld joint in the desired manner between this terminal connection and the tongue corresponding to this terminal connection.

A welding device for the production of the weld joint by means of a control can be controlled in such a way that by means of the welding device the proportion of the respective material with corresponding and material-different terminal connections and tongues can be adjusted when connected. In this way, it is also possible to adjust the proportion of the respective material, for example the aluminum of an aluminum terminal connection on one side and the copper of a copper tongue assigned to this aluminum terminal connection on the other side, in the desired manner for the production of a proper and thus functionally reliable weld joint between this terminal connection and the tongue corresponding to this terminal connection. Depending on the requirements of the individual case, the welding device and the welding process carried out with it can be freely selected within wide suitable limits. For example, the welding device may be suitably designed for laser welding, arc welding, plasma welding or resistance welding. Accordingly, the structure of the welding device can be different.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5b is a second variant of the cell composite, in which the cell connector has an at least partially elastic core.

DETAILED DESCRIPTION

Figure 1:
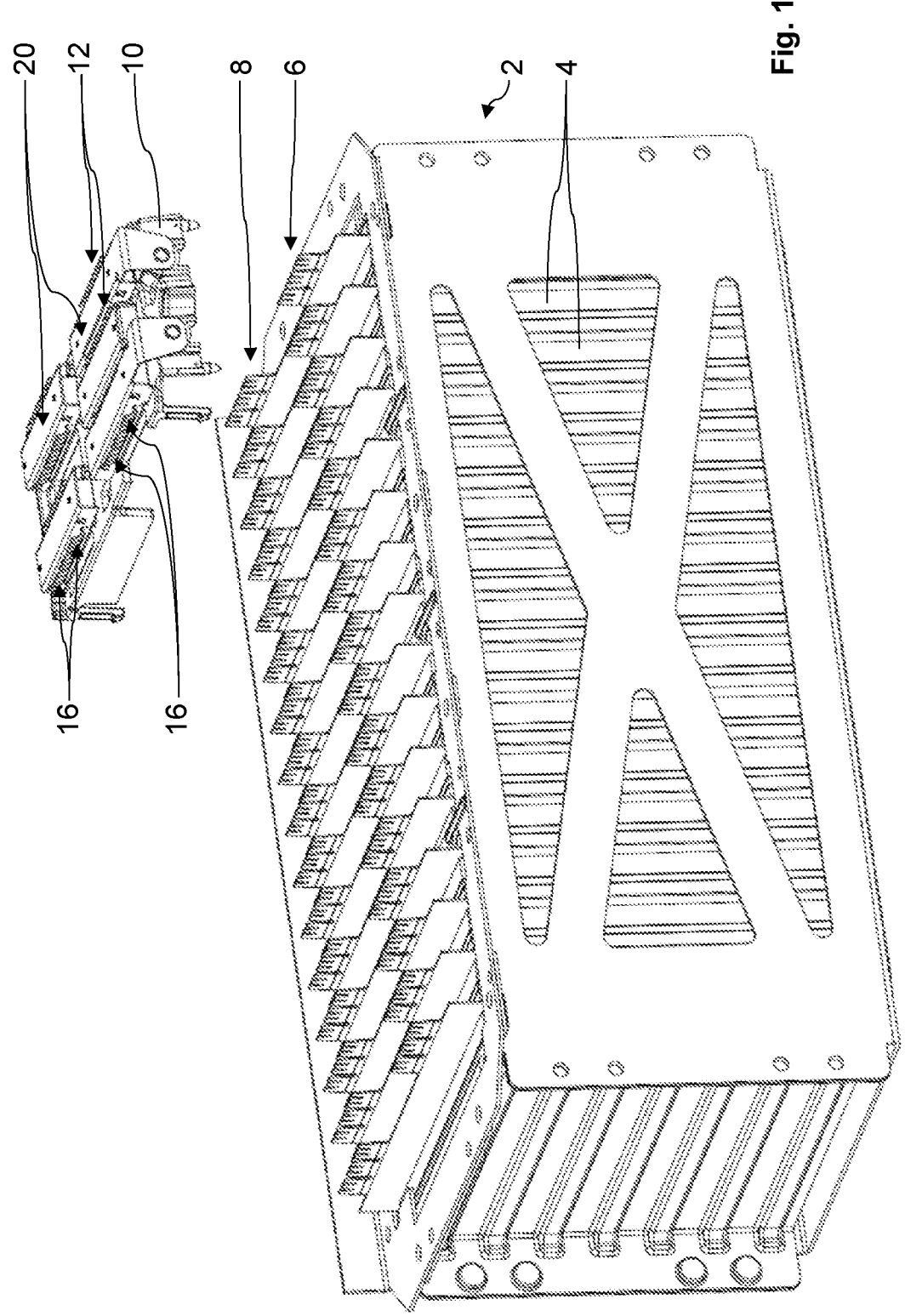
FIG. 1 is an embodiment of the cell composite according to the invention in a perspective representation, with the cell connector in a disassembled position.

FIGS. 1 to 5b show an embodiment of the cell composite according to the invention by way of example. The cell composite 2 comprises a plurality of energy storage cells 4 formed as pouch cells, each having two planar terminal connections 6, 8, wherein in each case a terminal connection 6, 8 of an energy storage cell 4 is conductively connected to a terminal connection 6, 8 of a neighboring energy storage cell 4. The terminal connection 6 is formed as an aluminum terminal connection made of aluminum and the terminal connection 8 is formed as a copper terminal connection made of copper. The conductively connected terminal connections 6, 8 are connected to each other by means of welding, namely laser welding, by means of a separate cell connector 10 in a mounting position of the cell connector 10 shown in FIGS. 3, 4, 5a and 5b, wherein the cell connector 10 has a corresponding tongue 12 in each case to the respective terminal connection 6, 8 and wherein the terminal connections 6, 8 and the tongues 12 each have a plurality of corresponding slots 14, 16, and wherein the slots 14 of the terminal connections 6, 8 extend substantially perpendicular from a free end of the respective terminal connection 6, 8 in the direction of a connection region of the respective terminal connection 6, 8 to the rest of the energy storage cell 4, and wherein the slots 16 of the tongues 12 extend substantially perpendicular from a free end of the respective tongue 12 in the direction of a connection region of the respective tongue 12 with the rest of the cell connector 10.

The slots 14, 16 of the terminal connections 6, 8 and the tongues 12 are dimensioned and positioned to each other in such a way that the corresponding terminal connections 6, 8 and tongues 12 can be spot-welded together between the slots 14, 16. In this respect, see FIG. 2, in which the terminal connections 6, 8 of one of the energy storage cells 4 are more clearly visible. As can be seen from FIG. 2, each of the terminal connections 6, 8 of the energy storage cell 4 has a total of six slots 14. The individual energy storage cells 4 are identically designed with regard to the aspects relevant to the invention. The single cell connector 10 with the tongues 12 and the slots 16 is shown partially and enlarged in FIG. 4. As can also be seen from this, the single cell connector 10 comprises a plurality of tongues 12, each of which is assigned to one of the terminal connections 6, 8 of the energy storage cells 4. As can be seen from FIG. 3, the cell composite 2 according to the present embodiment has a total of four such cell connectors 10. The individual cell connectors 10 are identical to each other. However, it is also conceivable that a single cell connector 10 is formed only for the connection of a terminal connection 6, 8 of one of the energy storage cells 4 to a terminal connection 6, 8 of another energy storage cell 4 of the cell composite 2.

Figure 2:
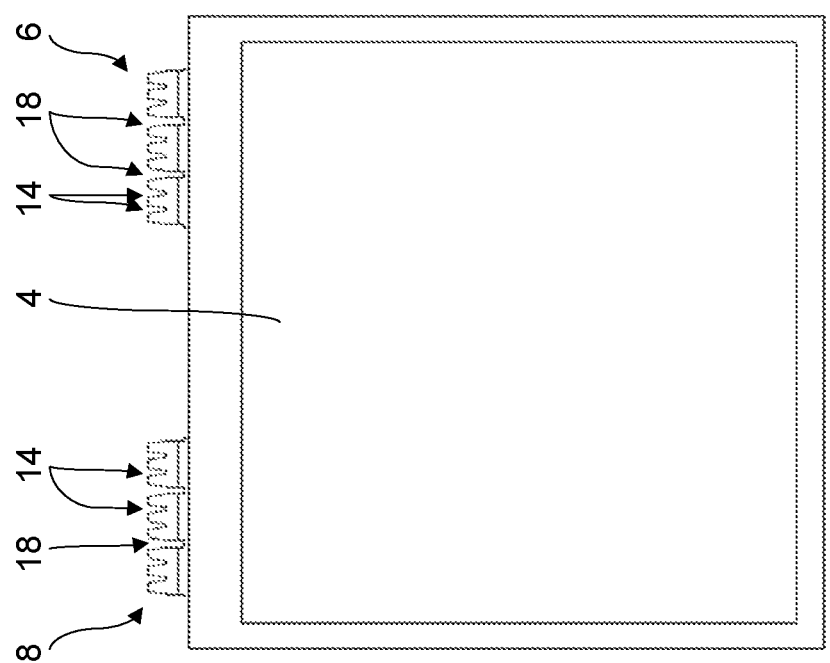
FIG. 2 is an energy storage cell of the cell composite from FIG. 1 in a frontal view.
Figure 3:
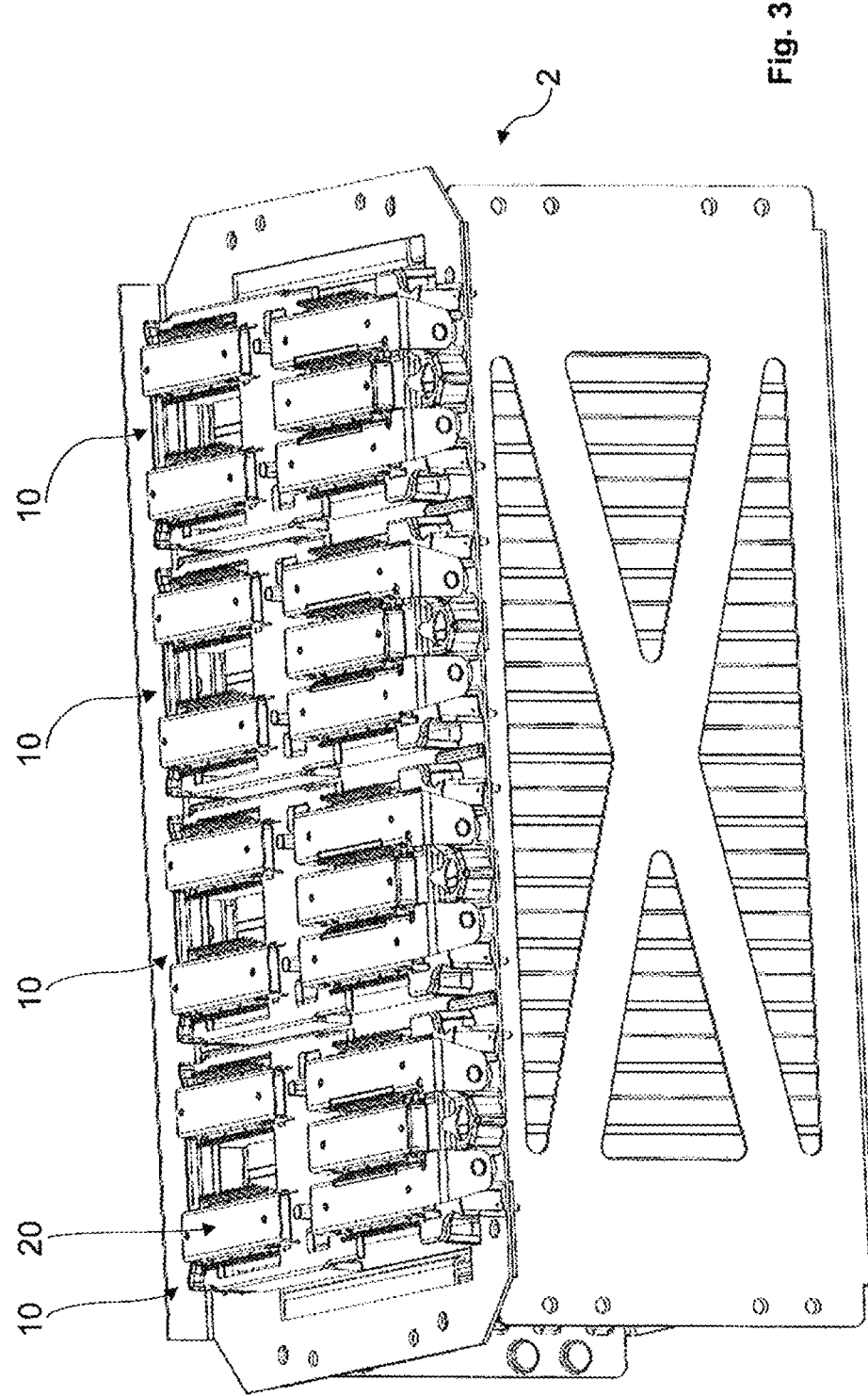
FIG. 3 is the embodiment in a further perspective representation, with the cell connector in its mounting position.
Figure 4:
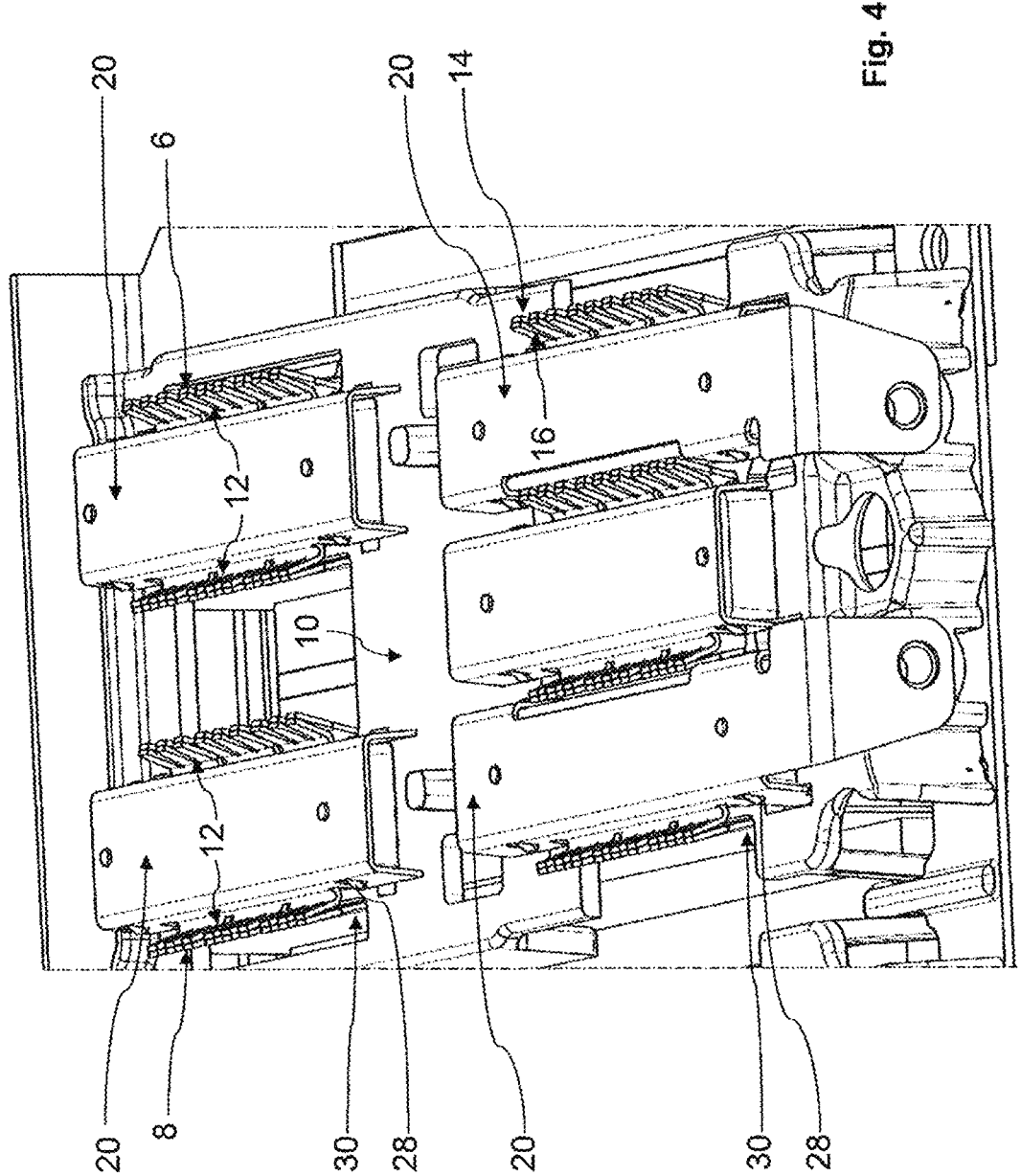
FIG. 4 is an enlarged detailed view of the cell composite in partial representation.

As can also be seen from FIG. 2, the terminal connections 6, 8, in addition to the respective slots 14, each have two notches 18, wherein the notches 18 run substantially parallel to the respective slots 14 and are designed in such a way that the bending stiffness of the respective terminal connection 6, 8 is reduced. In the present embodiment, the notches 18 each additionally act as slots 14. Accordingly, the tongues 12 are also formed on the individual cell connectors 10 in such a way that the corresponding terminal connections 6, 8 and tongues 12 can be spot-welded together between the slots 14, 16 and 18, 16.

The single cell connector 10 has on its side facing away from the energy storage cells 4 a heat transfer section 20 for heat transfer from the tongues 12 of the cell connector 10 to a separate heat sink 22. The heat sink 22 is only shown in FIGS. 5a and 5b.

Figure 5A:
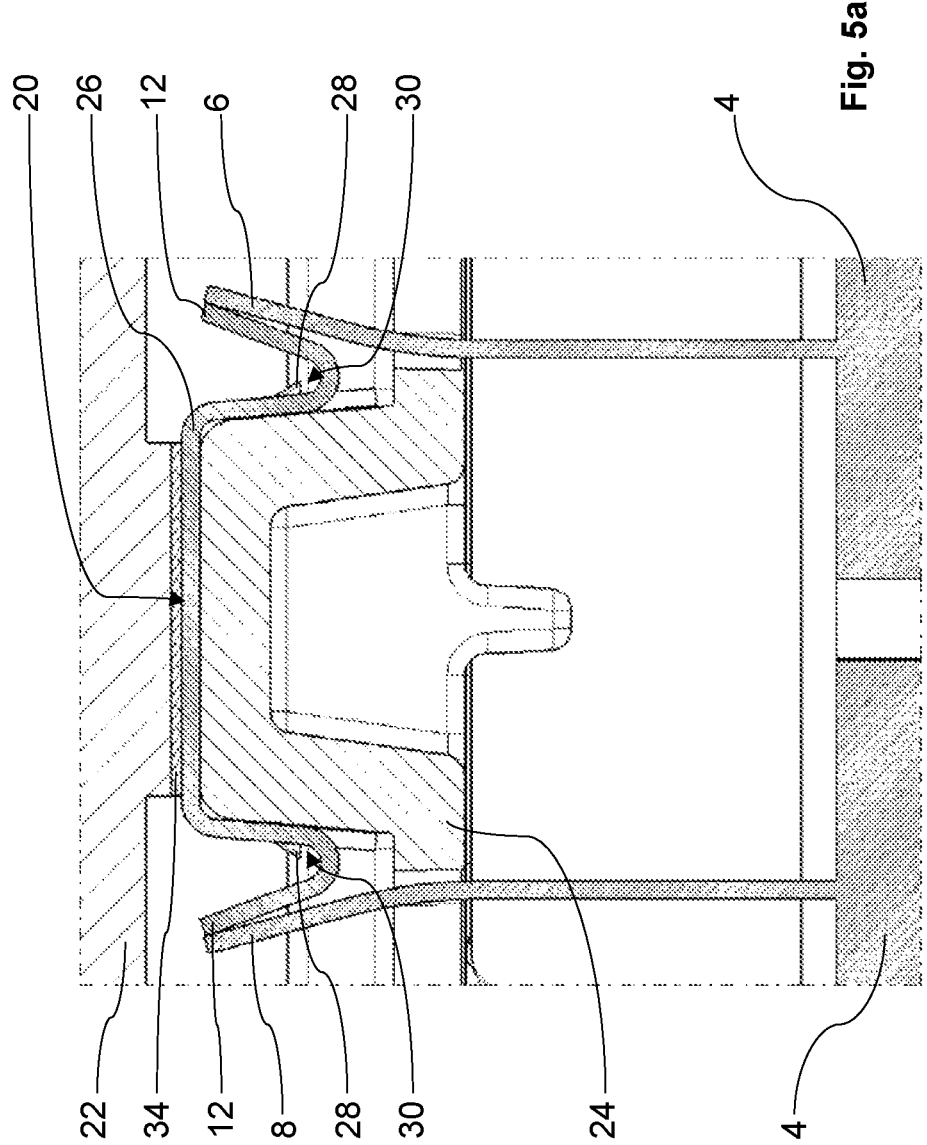
FIG. 5a is a first variant of the cell composite.

The cell connector 10 is shown in more detail in its mounting position in FIGS. 5a and 5b. As can be seen from this, the partially shown cell connector 10 according to the variant shown in FIG. 5a has five cores 24, to which the tongues 12 of the cell connector 10 are detachably attached. The tongues 12 assigned to two terminal connections 6, 8 to be connected to each other are arranged on a base body 26, wherein the base body 26 and the tongues 12 are formed as a single component of copper. In the variant shown in FIG. 5b, the cell connector 10 also has five cores 24, to which the tongues 12 of the cell connector 10 are also detachably attached. The two tongues 12 assigned to terminal connections 6, 8 to be connected to each other are in turn arranged on a base body 26, wherein the base body 26 and the tongues 12 are formed as a single component of copper. The single component comprising the base body 26 and the tongues 12 is attached to the corresponding core 24 by means of a latching connection. For this purpose, the core 24 has a total of four latching hooks 28 and the base body 26 a total of four corresponding latching openings 30. In this respect, also see FIG. 4. In contrast to the variant according to FIG. 5a, the variant according to FIG. 5b has an at least partially elastic core 24. In the present embodiment, this is realized in that an elastic layer 32 is arranged on a first portion 27 of the core 24.

In the following, the method according to the invention for the production of a cell composite as well as the function of the cell connector according to the invention according to the present embodiment is explained in more detail based on FIGS. 1 to 5b.

First, the individual energy storage cells 4 of the cell composite 2 are arranged next to each other as shown in FIG. 1. The cell connectors 10, of which only one is shown in FIG. 1, are in a disassembled position. As can be seen from FIG. 1, the terminal connections 6, 8 of the individual energy storage cells 4 extend vertically upwards. For the purpose of conductive connection of adjacent terminal connections 6, 8 of the energy storage cells 4 for the formation of the cell composite 2, the total of four cell connectors 10 with their tongues 12 in the image plane of FIG. 1 are pushed from above onto the terminal connections 6, 8 of the energy storage cells 4, such that the tongues 12 come into engagement with the corresponding terminal connections 6, 8. Also see FIGS. 3, 4, 5a and 5b in summary.

As can be seen from FIGS. 5a and 5b, the tongues 12 of the individual cell connector 10 are formed in such a way that in the mounting position of the cell connector 10 the tongues 12 rest against the corresponding terminal connections 6, 8 of the energy storage cells 4 in a wedge shape. Furthermore, the terminal connections 6, 8 and the tongues 12 are spring-loaded, wherein the terminal connections 6, 8 and the corresponding tongues 12 are prestressed against each other in the illustrated mounting position of the individual cell connector 10. Subsequently, the corresponding terminal connections 6, 8 of the energy storage cells 4 and tongues 12 of the cell connectors 10, which are to be conductively connected to each other, are welded together at the adjacent free ends of the terminal connections 6, 8 and the tongues 12 by laser welding. The free ends are spot-welded between the corresponding slots 14 and notches 18 of the terminal connections 6, 8 on one side and the slots 16 of the tongues 12 on the other side. In this respect, see also FIG. 2, from which the individual slots 14 and notches 18 of the terminal connections 6, 8 of the individual energy storage cell 4 are recognizable in a frontal view in conjunction with FIG. 4. In the mounting position of the individual cell connectors 10, each of the prongs of the terminal connections 6, 8 arising between the slots 14 and notches 18 is assigned to a prong formed on one of the tongues 12 of the respective cell connector 10 by the slots 16, whose free end is welded to the free end of the aforementioned prong of the terminal connections 6, 8. The corresponding slots 14, 18, 16 of the terminal connections 6, 8 of the energy storage cells 4 and the tongues 12 of the cell connectors 10 also enable a gentle production of the weld joints and a substantially free shrinkage of the melt. The weld can form as an advantageous spherical shape.

In the transfer of the individual cell connector 10 to its mounting position before welding, the terminal connections 6, 8 and the corresponding tongues 12 have been positioned to each other in such a way that by means of this positioning the proportion of the respective material can be adjusted in the corresponding and material-different terminal connections 6 and tongues 12 when they are welded. In the present embodiment, this is the case for the laser welding of the aluminum terminal connections 6 with the corresponding tongues 12 of the cell connectors 10, which are formed of copper. Alternatively, or in addition to this, a welding device, not shown, for the production of the laser welding connection can be controlled by means of a control, not shown, in such a way that by means of the welding device the proportion of the respective material in the corresponding and material-different terminal connections 6 and tongues 12 can also be adjusted when they are welded. The two aforementioned measures make it possible to reduce the formation of brittle aluminum-copper phases during the production of the weld joint to a minimum.

Subsequently, the separate heat sink 22 is connected to the rest of the cell composite 2, so that the heat sink 22 enters into heat transfer connection with the base body 26, on which the heat transfer section 20 of the individual cell connector 10 is arranged. For the purpose of electrical insulation, an insulating layer 34 formed as thermal compound is arranged between the heat transfer section 20 and the heat sink 22. In order to be able to design the insulating layer 34 as thin as possible and at the same time to ensure a proper and functionally reliable heat transfer from the individual cell connector 10 to the heat sink 22, the elastic layer 32 is provided in the variant according to FIG. 5b. By means of the elastic layer 32, tolerance compensation is possible, so that the thickness of the insulating layer 34 can be minimally formed. The heat transfer from the individual energy storage cell 4 via its terminal connections 6, 8 and the corresponding cell connector 10 with its tongues 12 to the heat sink 22 is thus optimized.

The invention is not limited to the present embodiment. For example, the invention can also be advantageously applied in other embodiments of cell composites. Accordingly, the application of the invention is also not limited to the pouch cells explained. The materials mentioned in the embodiment are also to be understood purely as examples. Furthermore, the method according to the invention is not restricted to laser welding.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A cell composite comprising:
   at least two energy storage cells, each having two planar terminal connections,
   wherein the terminal connections of adjacent energy storage cells are conductively connected to one another,
   wherein the terminal connections, that are conductively connected, are connected to each other by welding via a separate cell connector in a mounting position of the cell connector,
   wherein the cell connector has a tongues that each correspond to a respective one of the terminal connections,
   wherein each of the terminal connections and each of the tongues have a plurality of corresponding slots,
   wherein the slots of the terminal connections are provided at a free end of the respective terminal connections in a connection region of the respective terminal connections, the terminal connections and the slots provided therein extending substantially perpendicular to the energy storage cell,
   wherein the slots of the tongues are provided at a free end of the respective tongues in a connection region of the respective tongues,
   wherein spot welds are provided that connect the tongues and the corresponding terminal connections together so that the terminal connections are conductively connected to one another via the cell connector, and
   wherein the terminal connections and the tongues are spring-loaded, and the terminal connections and the corresponding tongues are prestressed against each other in the mounting position of the cell connector.

2. The cell composite according to claim 1, wherein the slots of the terminal connections and the slots of the tongues are dimensioned and positioned to each other in such a way that the corresponding terminal connections and tongues are spot-welded together between the slots of the terminal connections and between the slots of the tongues.

3. The cell composite according to claim 1, wherein the tongues of the cell connector are designed in such a way that in the mounting position of the cell connector the tongues rest against the corresponding terminal connections in a wedge shape.

4. The cell composite according to claim 1, wherein the terminal connections and/or the tongues, in addition to the respective slots, have at least one notch, wherein the notch extends substantially parallel to the respective slots and is formed in such a way that a bending stiffness of the respective terminal connections and/or the respective tongues is reduced.

5. The cell composite according to claim 1, wherein the cell connector on a side facing away from the energy storage cells has a heat transfer section for heat transfer from the tongues of the cell connector to a separate heat sink.

6. The cell composite according to claim 1, wherein the cell connector has an at least partially elastic core, and wherein the tongues are detachably attached to the core.

7. The cell composite according to claim 1, wherein the tongues of the cell connector are formed of copper.

8. The cell composite according to claim 1, wherein the two terminal connections of each respective energy storage cell are produced from different materials, and wherein the materials differ from each other at least with regard to their melting points.

9. The cell composite according to claim 8, wherein each energy storage cell has a terminal connection made of copper and a terminal connection made of aluminum.

10. A method for the production of a cell composite according to claim 1, the method comprising connecting the terminal connections to the corresponding tongues of the cell connector by welding or laser welding.

11. The method according to claim 10, wherein the corresponding terminal connections and tongues are each welded together by a plurality of spot welds.

12. The method according to claim 10, wherein the terminal connections and the corresponding tongues, when the cell connector is transferred to the mounting position, are positioned to each other such that via this positioning, a proportion of respective material in corresponding and material-different terminal connections and tongues is adjustable when the terminal connections and the tongues are connected.

13. The method according to claim 12, wherein a welding device for a production of a spot weld is controlled, such that by the welding device, the proportion of the respective material in the corresponding and material-different terminal connections and tongues is adjustable when the terminal connections and the tongues are connected.

14. The cell composite according to claim 1, wherein an inner surface of the terminal connections is connected to an exterior surface of the tongues, respectively, and wherein when the inner surface of the terminal connections is connected to the exterior surface of the tongues, respectively, the slots of the terminal connections are aligned with the slots of the tongues.

15. The cell composite according to claim 1, wherein the terminal connections and the tongues each extend linearly, such that the slots of each of the tongues extend in a first row and the slots of each of the terminal connections extend in a second row.

16. The cell composite according to claim 1, wherein each respective slot of the terminal connections aligns with a respective slot of the tongues, such that the terminal connections and the tongues have a same number of slots as one another.

* * * * *